Feb. 17, 1959     A. E. NOEL     2,873,545
THREE DIMENSIONAL PICTURE
Filed June 3, 1954     2 Sheets-Sheet 1
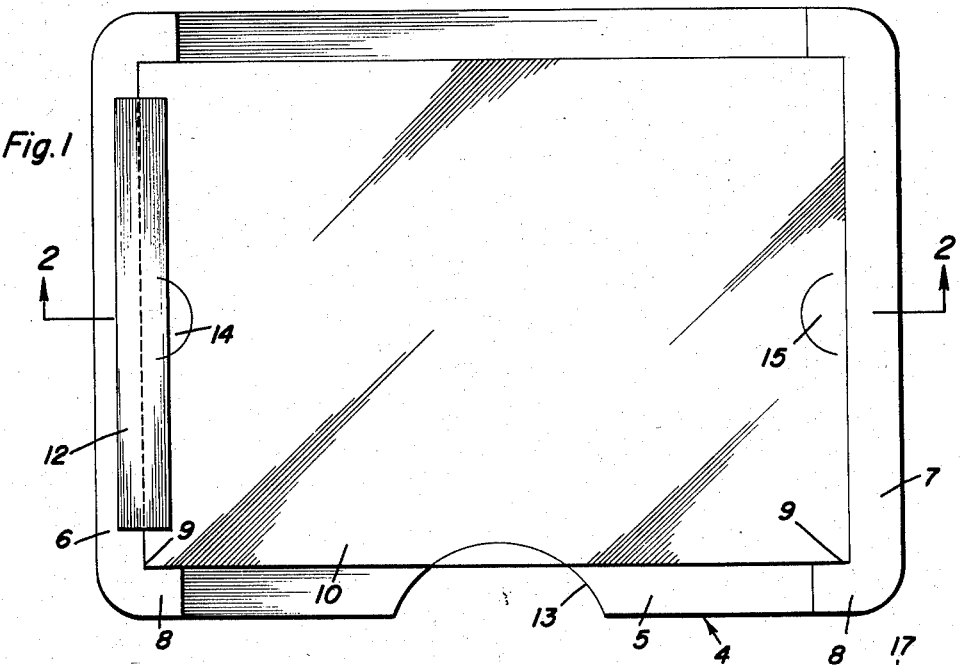
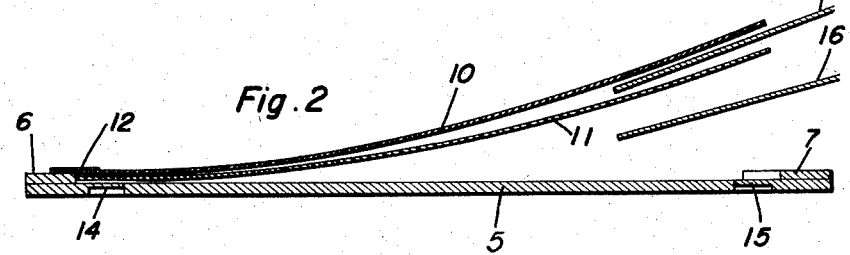
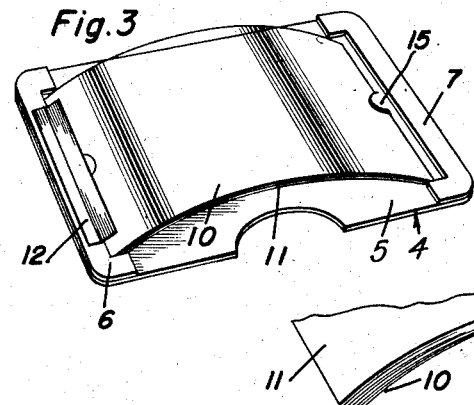 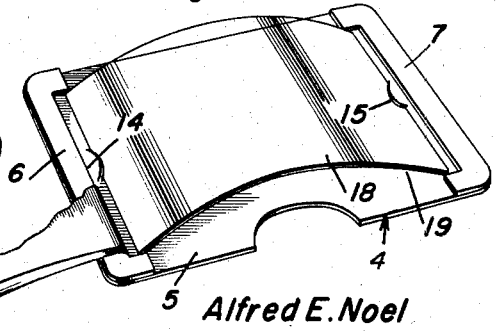
Alfred E. Noel
INVENTOR.

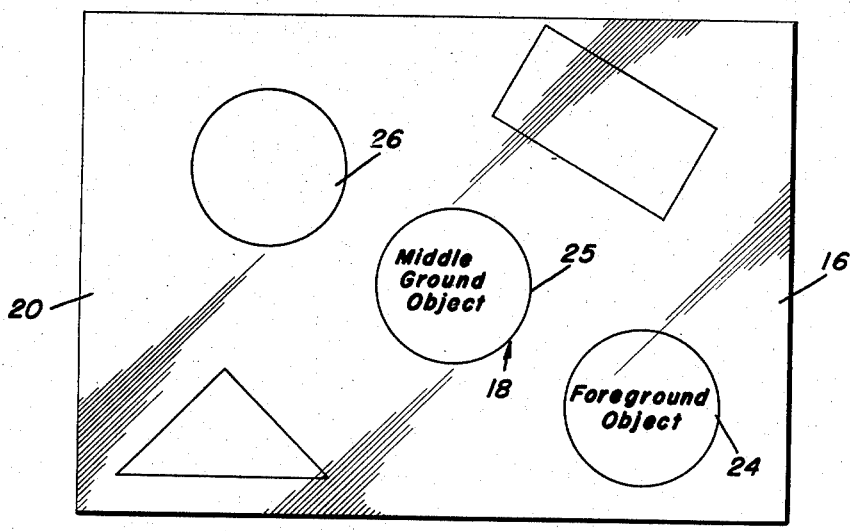
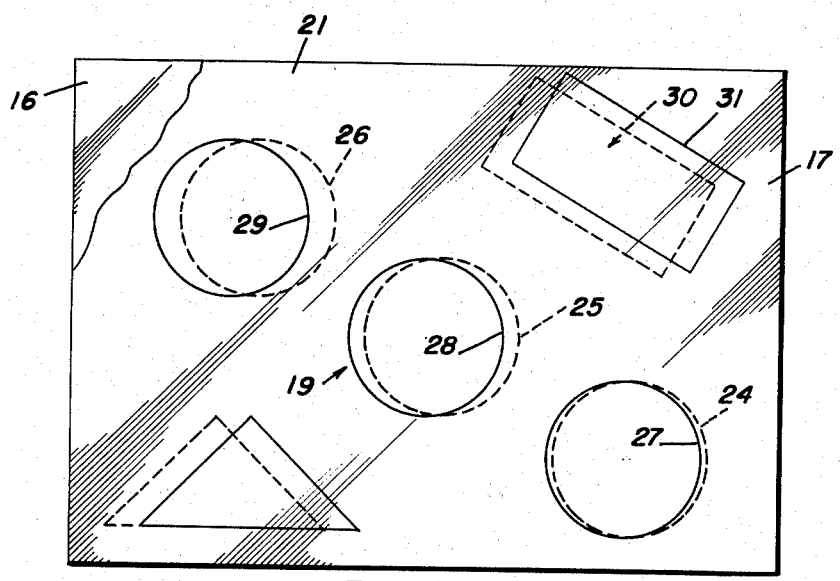

United States Patent Office 2,873,545
Patented Feb. 17, 1959

2,873,545

THREE DIMENSIONAL PICTURE

Alfred E. Noel, San Diego, Calif.

Application June 3, 1954, Serial No. 434,211

1 Claim. (Cl. 40—160)

The present invention relates to new and useful improvements in the art of drawing three dimensional pictures.

An important object of the invention is to provide duplicate pictures in pairs which may be traced separately on individual transparent sheets with contrastingly colored crayons and in a laterally offset position with respect to each other, whereby, when viewed through correspondingly colored lenses or filters of eyeglasses or other viewing devices, an impression of depth or three dimensional appearance will be created.

Another object of the invention is to provide a drawing or tracing pad to which a pair of transparent superposed leaves are attached for tracing thereon laterally offset scenes or objects from a pair of opaque copy sheets insertable respectively under the leaves to reproduce on the leaves duplicate pictures arranged for three dimensional viewing.

A further object is to provide means on a rigid backing member of the pad for easily and quickly placing interchangeable transparent tracing and copy sheets individually on the pad in a fixed superposed relation and to hold the sheets stationary while the picture is being traced.

A still further object is to construct the backing member or base of the pad with means for supporting the superposed transparent sheets provided with the three dimensional picture in an arched position above the backing member so that when viewing the picture the eyes will be focused only on the picture and not through the transparent sheets to the white base of the pad as an improved means for successfully perceiving the three dimensional picture.

An additional object is to provide a device of this character of simple and practical construction, which is efficient and reliable in use, relatively inexpensive to manufacture and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the pad with the transparent tracing sheets shown bound thereto in tracing position;

Figure 2 is a sectional view taken on a line 2—2 of Figure 1;

Figure 3 is a perspective view showing the tracing sheets arched for viewing the picture;

Figure 4 is a perspective view of a modified arrangement for holding unattached tracing sheets in arched viewing position, and Figures 5 and 6 are plan views of the copy sheets with offset pictures thereon for three dimensional tracing.

Referring now to the drawings in detail, wherein for the purpose of illustration I have disclosed a preferred embodiment of my invention, the numeral 4 designates a drawing pad generally and which comprises a back member 5 of suitable rigid material, such as heavy cardboard, or the like, and of rectangular shape.

Frame members 6 and 7 are integrally formed or may be cemented or otherwise suitably secured on top of the back member at each end portion of the latter and each frame member is of substantially U-shape having relatively short right angularly disposed leg portions 8 parallel to the side edges of the back member to form the internal corners 9 of the frame.

A pair of superposed tracing sheets 10 and 11 of transparent acetate or other suitable flexible material are constructed of an area coextensive with the internal area formed by the frame members 6 and 7 so that the tracing sheets fit closely in the corners 9 of the frame members. A flexible tape 12 is folded upon itself and between the folds of which one edge portion of both sheets 10 and 11 are cemented and with one longitudinal edge of the tape cemented on top of one of the end frame members 6 to bind the sheets to the backing member of the pad and with the free ends of the sheets adapted for opening and closing on top of the backing member in a manner similar to the bound pages of a writing pad.

A notch 13 is formed in one longitudinal edge of the backing member to extend inwardly under the sheets 10 and 11 to facilitate raising the sheets separately or as a unit.

Arcuate tabs 14 and 15 are integrally formed of a reduced thickness from the material of the backing member immediately inwardly of the frame members 6 and 7 and the tabs are severed along their arcuate edges in opposed relation to each other, while the remaining edges of the tabs remain united with the backing member to flex the tabs upwardly for a purpose more fully hereinafter explained.

A pair of copy sheets or cards 16 and 17 preferably of rigid, opaque material and coextensive in area with the tracing sheets have duplicate pictures or objects 20 and 21 printed or otherwise displayed respectively thereon and with the picture of one copy card offset laterally with respect to the picture of the other copy card.

The pictures of the two copy cards 16 and 17 are traced on the respective tracing sheets 10 and 11 with contrastingly colored crayons, such as red and blue, by placing the copy card 16 under the lowermost tracing sheet 11 and placing the copy card 17 under the uppermost tracing sheet 10.

The pictures accordingly will be reproduced from the copy cards onto the tracing sheets in their offset arrangement and by removing the copy cards and viewing the offset pictures on the transparent tracing sheets through correspondingly colored lens of eyeglasses or other viewing devices a three dimensional picture will be created.

In order to more effectively perceive the three dimensional picture the superposed transparent sheets 10 and 11 are arched and supported in their arched position by inserting the free ends of the sheets under the tab 15, as shown in Figure 3. In viewing a stereogram or superposed tracing in such an arched position, the eyes are focused only on the tracings and not through the transparent sheets to the white base or backing member of the pad. The white base being more distant from the focal point, the base is not perceptible or included as a part of the tracings when viewing the same, in the same manner it would if the transparent sheets were in a flat position in contact with the base of the pad. Should the transparent sheets be placed flat on the base, the tracings as well as the base would all be at the focal point and subject the eyes to strain to force the eyes to disassociate the white base from the focal point to perceive a three dimensional tracing or picture.

In Figure 4 an auxiliary pair of unbound superposed tracing sheets 18 and 19 are loosely placed in the frame members 6 and 7 of the backing member 5 and are held in an arched position by inserting the opposite end edge of the sheets under the opposing tabs 14 and 15. When viewing the picture on the sheets 18 and 19, the bound sheets 10 and 11 are swung out of the way at one end of the pad.

Figures 5 and 6 represent the pair of copy cards 16 and 17 on which the pictures 20 and 21 are respectively drawn or printed in laterally offset relation with respect to each other when the cards are disposed in superposed relation, as shown in Figure 6.

The copy cards are coextensive in area with the tracing sheets 10 and 11 to fit closely in the frame members 6 and 7 and one card 16 is placed in the frame under the lowermost tracing sheet 11 in order that the picture on the card may be traced on the sheet by means of a colored crayon. The card 16 is then removed and the second card 17 is then placed under the uppermost tracing sheet 10 and the picture on the second card is then traced onto the sheet 10 likewise by means of a contrastingly colored crayon.

Upon removal of the second copy card 17, the superposed pictures on the upper and lower tracing sheets will appear in laterally offset relation to each other and will give the impression of depth on three dimensional appearance to the picture when viewed through eyeglasses equipped with correspondingly colored lenses.

The auxiliary unbound tracing sheets 18 and 19 may be placed in the frame of the pad 5 independently of the bound sheets 10 and 11 and pictures traced thereon in the same manner as heretofore explained so that innumerable pairs of tracing sheets and copy cards may be used for reproducing various three dimensional pictures.

Either the bound or unbound tracing sheets may be supported on the pad in an arched position under the tabs 14 and 15 to improve the viewing thereof.

Figures 5 and 6 also illustrate a method of printing or otherwise displaying separately printed pictures in a group, as indicated at 24, 25 and 26 on card 16, and as indicated at 27, 28 and 29, on card 17 and in an offset arrangement to more accurately conform with the rules of perspective scenes when prepared for three dimensional viewing.

Of the two separately printed groups, one group, as for instance on the card 16, depicts a scene with all parts and objects of the scene in normal relationship to each other, while the second group on card 17 shows the same scene, the same parts of the scene, and the same objects of the scene, but displaced laterally with respect to the first group.

The parts and objects printed on the foreground picture 24 of card 16 are displaced a predetermined degree with respect to the foreground picture 27 of card 17, while the parts and objects of the middle-ground picture 25 of card 16 are displaced to a greater degree with respect to picture 28 of card 17 than the lateral displacement of the foreground picture, and a still greater degree in the displacement is provided for the picture 26 of card 16 and picture 29 of card 17 in the background picture.

Parts and objects shown and printed in the inbetween grounds or planes of the groups of pictures of the respective cards are also laterally displaced proportionately.

The direction of lateral displacement may be reversed, if desired, as indicated at 30 and 31.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A picture device comprising a rigid rectangular base having at one end a U-shaped frame member, a pair of transparent rectangular superposed sheets of flexible material having corresponding ends fitting in said frame member and adhesively hingedly secured together and to said frame member, said sheets having pictures delineated thereon in relatively offset relation for three-dimensional viewing thereof through said sheets, and a tab on the other end of said base under which the other ends of said sheets are inserted, said tab being spaced from said adhesively secured ends of said sheets a distance less than the length of the sheets to arch said sheets upwardly for admitting light onto the same to facilitate viewing therethrough, said hinged ends providing for upward arching of said sheets without bending the sheets at said hinged ends, and said frame and tab holding said sheets in arched engaging position.

References Cited in the file of this patent

UNITED STATES PATENTS

| | | |
|---|---|---|
| 1,421,975 | Meyers | July 4, 1922 |
| 1,576,636 | Egan | Mar. 16, 1926 |
| 2,136,486 | Blondin | Nov. 15, 1938 |
| 2,160,724 | Fletcher | May 30, 1939 |
| 2,220,527 | Kroner | Nov. 5, 1940 |
| 2,386,418 | Armbrust | Oct. 9, 1945 |
| 2,565,553 | Foley | Aug. 28, 1951 |
| 2,637,924 | Hutt | May 12, 1953 |
| 2,720,722 | Hiser | Oct. 18, 1955 |

FOREIGN PATENTS

| | | |
|---|---|---|
| 990,303 | France | June 6, 1951 |